United States Patent [19]
Mojden et al.

[11] Patent Number: 5,346,050
[45] Date of Patent: Sep. 13, 1994

[54] CARTON CONVEYING APPARATUS

[75] Inventors: Daniel R. Mojden, Clarendon Hills; Thomas E. Close, Jr., Shorewood, both of Ill.

[73] Assignee: Fleetwood Systems, Inc., Countryside, Ill.

[21] Appl. No.: 10,276

[22] Filed: Jan. 28, 1993

[51] Int. Cl.$^5$ .............................................. B65G 15/64
[52] U.S. Cl. ................. 198/345.2; 198/841; 198/803.14
[58] Field of Search ............ 198/841, 838, 793, 345.2, 198/803.14, 377

[56] References Cited

U.S. PATENT DOCUMENTS

| | | | |
|---|---|---|---|
| 2,830,712 | 4/1958 | Sykokis | 198/377 X |
| 2,856,054 | 10/1958 | Fausset | 198/793 X |
| 2,886,165 | 5/1959 | Eger | 198/377 X |
| 3,618,734 | 11/1971 | Khan | 198/793 X |
| 3,675,759 | 7/1972 | Koppe | 198/803.14 X |
| 3,722,741 | 3/1973 | Mojden . | |
| 4,000,709 | 1/1977 | Mojden . | |
| 4,149,620 | 4/1979 | Rosenweig | 198/345.2 |
| 4,402,393 | 9/1983 | Kent | 198/793 X |
| 4,545,477 | 10/1985 | Besch | 198/841 |
| 4,562,919 | 1/1986 | Cattani | 198/345.2 X |
| 4,592,462 | 6/1986 | Mojden et al. . | |
| 4,765,440 | 8/1988 | Tashmann | 198/841 X |
| 5,038,919 | 8/1991 | Harston | 198/841 X |

*Primary Examiner*—D. Glenn Dayoan
*Attorney, Agent, or Firm*—Trexler, Bushnell, Giangiorgi & Blackstone, Ltd.

[57] ABSTRACT

An article delivery station alignment apparatus is provided for use with a carousel-type rotary infeed device for articles arranged in stacks of a predetermined length, which infeed device is made of a plurality of carrier pockets each for receiving a stack of articles and movable about a closed chain relative to an article delivery station, located at one end of the chain and defining a vertical axis, wherein articles are to be discharged from the carrier pockets, the carrier pockets and the stacks of articles therein being aligned with respective axes parallel to the vertical axis. The alignment apparatus includes a pair of sprockets, one to either side of the vertical axis of the delivery station and engaging the chain for defining a relatively short, straight segment of chain traversing the article delivery station, and a rigid chain guide located between the sprockets for holding the chain in a relatively straight and rigid condition as it traverses the article delivery station. The invention also provides a stabilizing apparatus including a projecting stabilizer pin on each of the carrier pockets defining a pin axis, a gripping arrangement located at the article delivery station, a pair of complementary rocker members spaced to either side of the pin axis and being mounted for pivotal motion toward and away from the pin axis, and a drive for driving the rocker members between a first position spaced apart from and to either side of the stabilizer pin of a carrier pocket located in the article delivery station and a second position grippingly engaging the stabilizer pin.

12 Claims, 3 Drawing Sheets

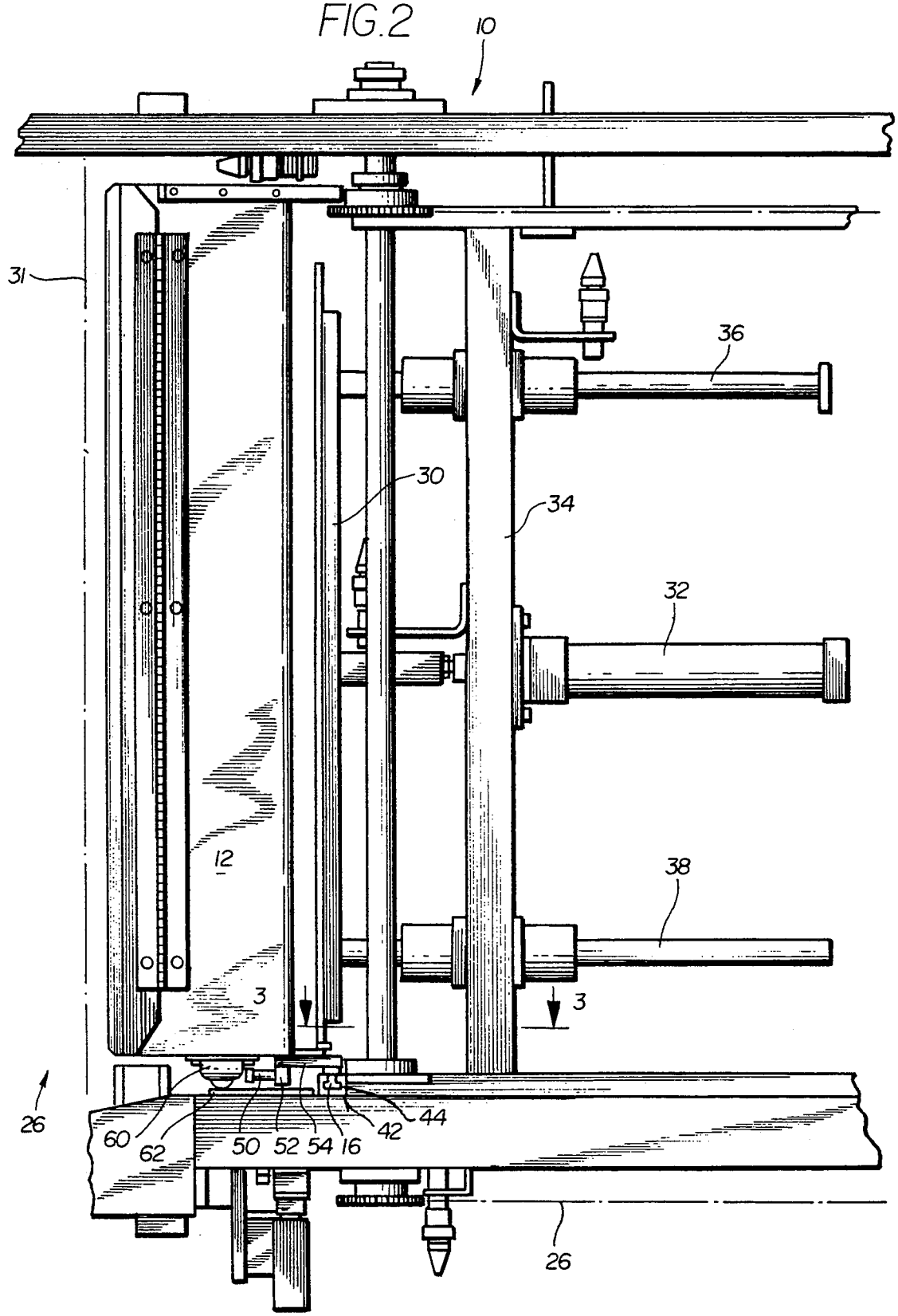

CARTON CONVEYING APPARATUS

BACKGROUND OF THE INVENTION

This invention relates to the improvements in an article conveying apparatus and more particularly to novel alignment apparatus for use with a carousel-type rotary infeed device for articles such as carton blanks.

One particularly novel and useful carousel-type infeed device or unit for carton blanks is illustrated and described in U.S. Pat. No. 4,592,462, which is commonly owned herewith. In this U.S. patent, the rotary or carousel-type infeed device is specifically adapted to handle carton blanks which are presented stacked in facewise condition, and in stacks of predetermined and generally uniform height or axial length. These infeed devices are similar in many respects to those which have been found commercially attractive for handling supplies of can ends for attachment to can bodies as described and claimed for example, in U.S. Pat. Nos. 3,722,741 and 4,000,709.

However, with the adaptation of these infeed units for use with carton blanks, certain additional problems were encountered. For example, processing machinery often will not function properly if the edges of the carton blanks have become bent or frayed during transfer from the infeed apparatus to a receiving conveyor or other supply means for a processing machine. Solutions to the foregoing and many of the other problems encountered with carton handling apparatus of this type are described and claimed in the above-mentioned U.S. Pat. No. 4,592,462. However, there remains room for further improvement.

Generally speaking, the carousel-type infeed device is arranged to provide a number of carrier pockets which can be moved about an "endless" or closed track relative to an article delivery station. Preferably, the track is of a generally elongate, oval configuration and the article delivery station is located at one longitudinal end thereof. Generally speaking, the article delivery station is arranged such that only one of the carrier pockets is in alignment with the article delivery station at a given time. In some applications, a second, similar so-called transfer pocket is brought into alignment with the carrier pocket at the article delivery station and a transfer mechanism is used to transfer the entire stack of articles from the carrier pocket to this transfer pocket. In effecting this transfer, it is important that the two pockets be closely aligned to avoid damage to or mishandling of the carton blanks during the transfer. As a related matter, it is important that the carrier pocket of the carousel infeed device be prevented from pivotal or rocking motion relative to the receiving transfer pocket while in the delivery station and during the article transfer operation.

While the present invention is illustrated and described herein with reference to the above-described problem of aligning the carrier pocket at an article delivery station with a transfer pocket, it should be recognized that the invention may find utility in any application wherein it is desired to maintain a given alignment and prevent rocking or pivotal motion of a carrier pocket of a carousel infeed device or other similar structure.

OBJECTS AND SUMMARY OF THE INVENTION

Accordingly, it is general object of this invention to provide a novel and improved article conveying apparatus.

A more particular object is to provide an article delivery station alignment apparatus for use with a carousel-type rotary feeder.

Briefly, in accordance with the foregoing objects, and in accordance with one aspect of the invention there is provided an article delivery station alignment apparatus for use with a carousel-type rotary infeed device for articles arranged in stacks of a predetermined length, which infeed device comprises a plurality of carrier pockets each for receiving one of said stacks of articles and movable about a closed track relative to an article delivery station wherein articles are to be discharged from said carrier pockets, said article delivery station being located at one end of said track and defining a vertical axis, said carrier pockets and the stacks of articles therein being aligned with respective axes parallel to said vertical axis, and wherein said track comprises a closed chain member engaging said carrier pockets and engaged with a plurality of sprockets, said alignment apparatus comprising: a pair of sprockets located adjacent said article delivery station, one of said sprockets being spaced to either side of said vertical axis and engaging said chain member for defining a relatively short, straight segment of said chain member traversing said article delivery station, and rigid chain guide means located between said pair of sprockets for holding said chain member in a relatively straight and rigid condition as it traverses said article delivery station intermediate said pair of sprockets, said pair of sprockets and said chain guide means cooperating for aligning a carrier pocket carried by said chain member and positioned between said pair of said sprockets with said vertical axis of said article delivery station and for discouraging pivotal, rocking motion of said carrier pocket relative to said vertical axis.

In accordance with another aspect of the invention there is provided stabilizing means comprising a projecting stabilizer pin on each of said carrier pockets defining a pin axis and gripping means located at said article delivery station, said gripping means comprising a pair of complementary rocker members spaced to either side of said pin axis, mounting means for mounting said rocker members for pivotal motion toward and away from said pin axis and drive means for driving said rocker members between a first position spaced apart from and to either side of said stabilizer pin of a carrier pocket located in said article delivery station and a second position grippingly engaging said stabilizer pin.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 2 is a partial side elevation of a carousel-type rotary infeed device including improvements in accordance with the invention;

DETAILED DESCRIPTION OF THE ILLUSTRATED EMBODIMENT

Figure 1:
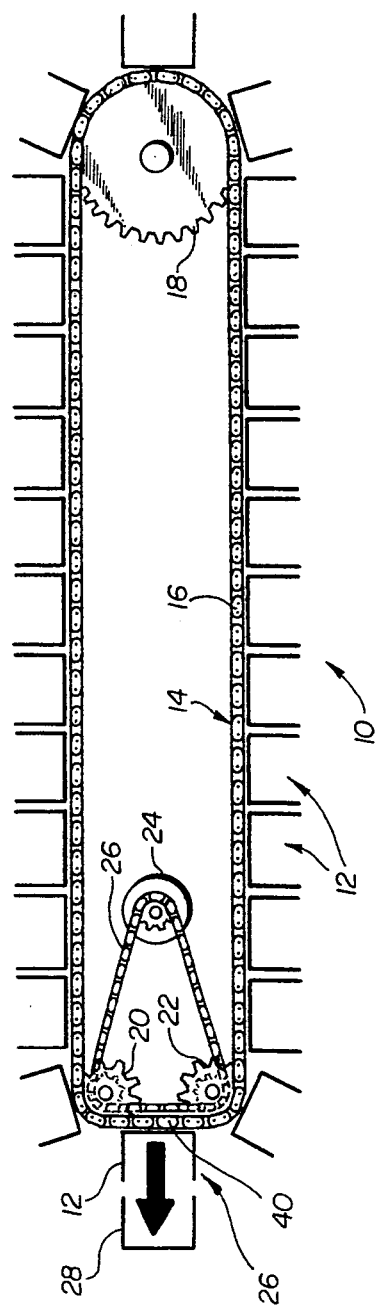
FIG. 1 is a top plan view, somewhat diagrammatic in form, of a carousel-type rotary infeed device with improvements according to the invention.

Referring now to the drawings and initially to FIGS. 1 and 2, there is shown a carousel-type rotary infeed device designated generally by the reference numeral 10. The infeed device 10 is substantially similar to that illustrated and described in U.S. Pat. No. 4,592,462, referred to hereinabove. Briefly, the infeed device 10 comprises a plurality of generally rectilinear carrier pockets 12, each of which is arranged for receiving a stack of articles such as carton blanks in a facewise nested condition. Generally speaking, the carton blanks are generally rectangular in shape and are stacked in groups or stacks of a predetermined length. The stacks of articles are loaded into the respective pockets 12 of the infeed device 10.

These carrier pockets are carried about an elongate closed track 14, which preferably comprises an elongate closed chain 16 to which the respective carrier pockets 12 are attached. The closed chain member 16 is in turn engaged about a plurality of sprockets to define the track 14. The sprockets include a first, relatively enlarged end sprocket 18 and, at an opposite end thereof, a pair of relatively smaller sprockets 20, 22, which form a portion of the present invention. A suitable drive means such as a motor 24 and drive chain 26 are engaged in suitable fashion for driving the chain 16 in rotary fashion about the sprockets 18 and 20, 22.

Sprockets 20 and 22 are located adjacent an outfeed or article delivery station 26 at which articles are discharged from the carrier pockets 12. In the illustrated embodiment, the articles are discharged into a transfer pocket 28 which is of similar configuration to the carrier pockets 12 and is located at the article delivery station 26 for alignment with one of the pockets 12. In this regard, it is important that alignment be maintained between the pocket 12 in the article delivery station and the transfer pocket 28 to ensure a relatively smooth and rapid transfer of carton blanks from the carrier pocket 12 to the transfer pocket 28. Slight misalignments which may be caused by tilting or pivoting of carrier pocket 12 are to be avoided in this regard.

A horizontally movable pusher bar 30 is provided in the illustrated embodiment for pushing the articles in a generally horizontal direction out of the carrier pocket 12 and into the transfer pocket 28 at the delivery station 26. In this regard the delivery station 26 generally defines a vertical central axis 31, and the carrier pockets and the stack of articles therein are aligned with axes parallel to this vertical axis 31. The pusher bar 30 may be driven by a piston and cylinder member 32 and slidably mounted to a suitable supporting frame member 34 by respective guide bars or rods 36, 38. Thus, for proper operation of the pusher bar 30 it is further necessary that the carrier pocket 12 be positioned in the article delivery station 26 in alignment with the axis 31 and transfer pocket 28 at also and in alignment with and parallel to the pusher bar 30, such that the stack of articles will be pushed by the pusher bar in a direct and linear fashion out of the carrier pocket and into the transfer pocket 28 without, tilting, pivoting, or the like.

Figure 4:
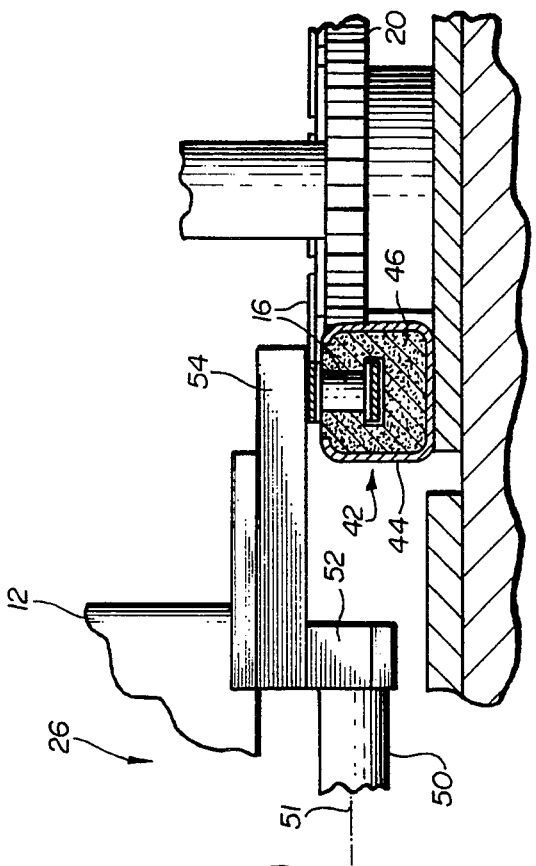
FIG. 4 is a sectional view taken generally along the line 4—4 of FIG. 3.
Figure 3:
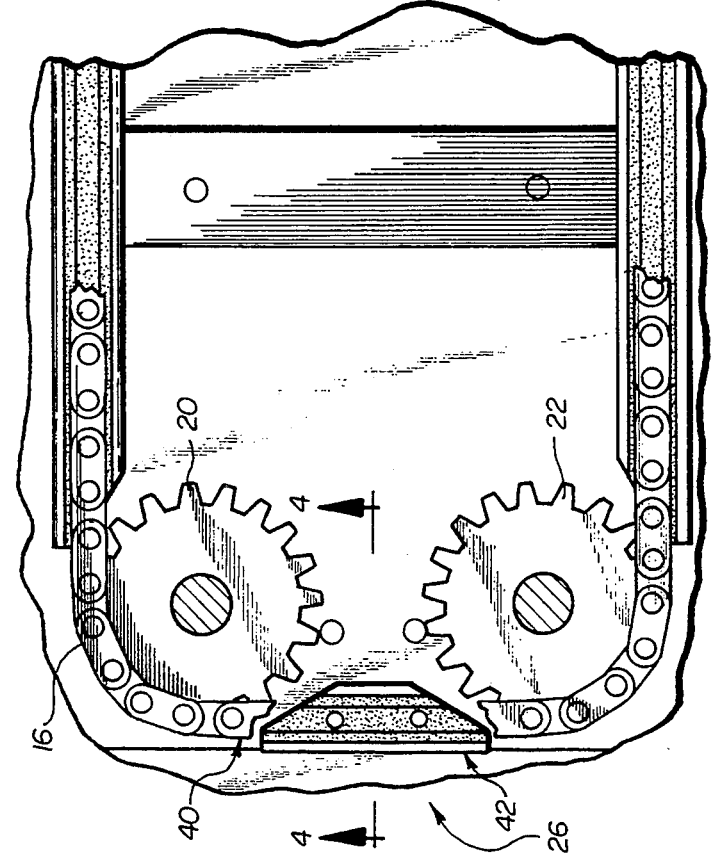
FIG. 3 is an enlarged partial sectional view of the apparatus of FIG. 2 taken generally along the line 3—3 thereof and showing a portion of the invention in greater detail.

Referring also to FIGS. 3 and 4, in accordance with one feature of the invention, the pair of sprockets 20, 22 replace a single relatively large sprocket similar to the sprocket 18 at the article delivery station 26. This pair of sprockets is located spaced to either side of the vertical central axis 31 of the article delivery station such that they engage the chain 12 to define a relatively short, and straight segment 40 of the chain member which traverses the article delivery station 26. It will be noted by way of contrast that as the chain rounds the sprocket 18, there is a constant radius of curvature, there being no straight or linear segments defined by the use of a single sprocket 18. Moreover, sprockets 20 and 22 are placed such that this straight or linear segment 40 of the chain 16 is aligned and parallel with the pusher bar 30 to thereby also align the carrier pocket therewith.

As is more fully described in the above-referenced U.S. Pat. No. 4,592,462, the carrier pocket has an opening in its side facing the pusher bar 30 to permit the pusher bar 30 to engage the stack of carton blanks therein for purposes of transferring this stack to the transfer pocket 28.

The alignment apparatus of the invention further includes a rigid chain guide means or assembly 42 which is located between the sprockets 20 and 22 for holding and guiding the chain member in a relatively straight and rigid condition as it traverses the article delivery station 26 intermediate the sprockets 20 and 22. In the preferred form of the invention illustrated herein and referring also to FIGS. 3 and 4, the rigid chain guide 42 comprises a generally U-shaped channel member 44. Preferably, a quantity of expanded rigid foam material 46 is introduced into the channel 44 in such a manner that the foam material closely surroundingly engages the chain 16 as it passes through the channel 44. This provides a relatively stable support for the chain 16 while yet permitting free passage through the chain guide 42, in sliding, relatively low friction engagement with the quantity of foam material 46. Advantageously, the pair of sprockets 20, 22 and chain guide assembly 42 cooperate for aligning a carrier pocket 12 carried by the chain 16 and positioned between the pair of sprockets 20, 22, with the vertical axis 31 of the article delivery station 26 and for generally discouraging pivotal, rocking motion of the carrier pocket relative to the vertical axis 31.

The invention further provides a novel stabilizing means or apparatus for further preventing pivotal or rocking motion of a carrier pocket relative to the vertical axis 31 at the article delivery station. This stabilizing means or apparatus includes a projecting stabilizer pin 50 which is located on each of the carrier pockets 12. In the illustrated embodiment, the stabilizer pin 50 is located on an axis 51 generally perpendicular to the vertical axis and a suitable bracket or bracket means 52 is provided for mounting the stabilizer pin 50 generally beneath each carrier pocket 12. In this regard, as shown in FIGS. 2 and 4, the carrier pocket 12 is joined to the chain 16 by a carrier plate 54. The bracket 52 which mounts the projecting stabilizer pin is also mounted to the same carrier plate 54. Preferably, the pocket 12 further rides on an enlarged ball bearing type of support member 60 which in turn engages and is supported by a support plate 62. The stabilizer pin will be seen to project generally adjacent the bearing support member 60.

Figure 6:
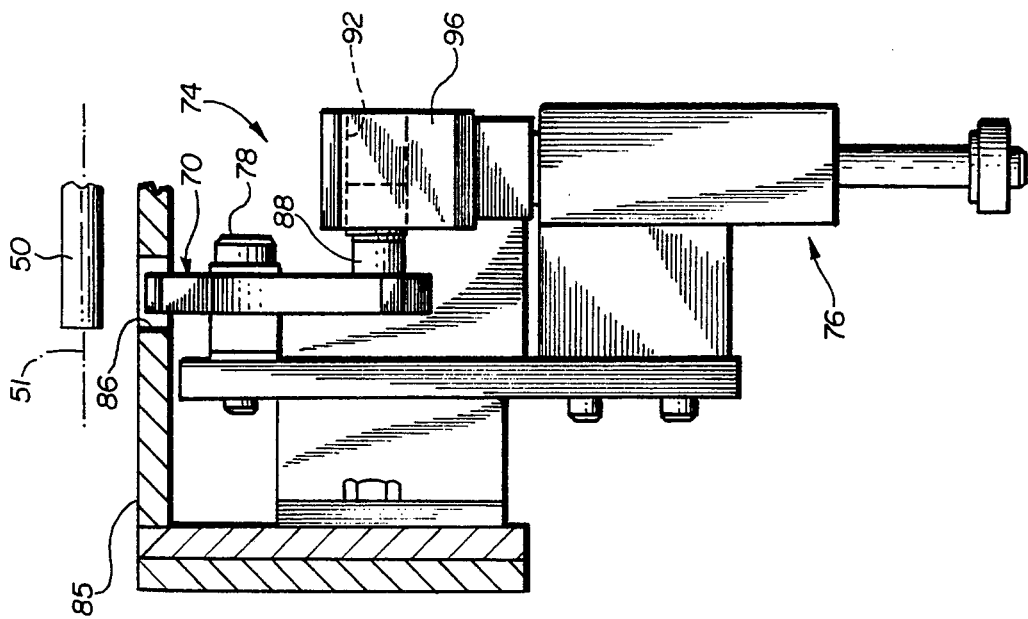
FIG. 6 is a side elevation taken generally in the plane of line 6—6 of FIG. 5.
Figure 5:
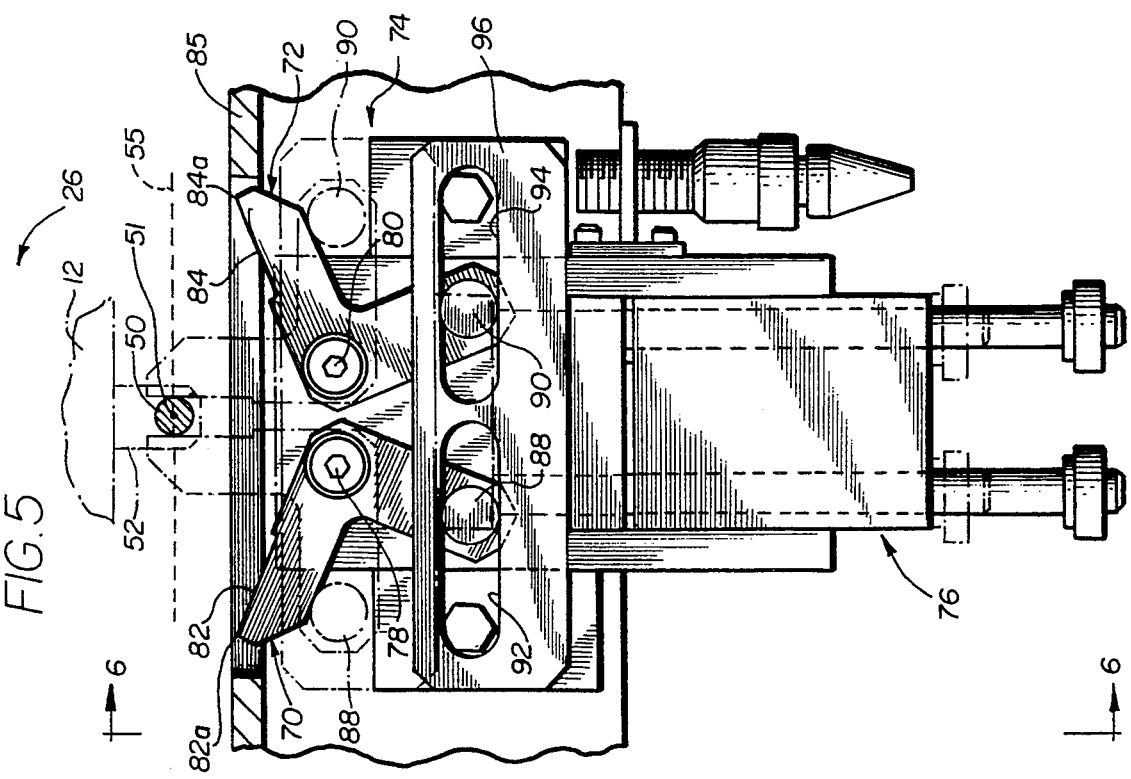
FIG. 5 is a bottom plan view of a portion of the apparatus of FIGS. 1 and 2 showing further details of improvements according to the invention.

Referring now to FIGS. 5 and 6, the stabilizing means further includes a pair of complementary rocker members 70, 72 which are spaced to either side of the pin axis 51. A mounting means or assembly 74 is provided for mounting the rocker members 70, 72 for pivotal motion generally toward and away from pin 50 and its axis 51. A drive means or assembly 76 bidirectionally drives the rocker members 70 and 72 between a first position, which is illustrated in solid line in FIG. 5, spaced apart from and to either side of the stabilizer pin 50 and a second position, illustrated in phantom line in FIG. 5, grippingly engaging the stabilizer pin 50. It will be understood that the stabilizer pin 50 shown in FIGS. 5 and 6 is associated with a carrier pocket 12 which is located in the article delivery station 26 and aligned and centered with the axis 31 thereof. It is noted in this regard that the cooperation of the stabilizer pin 50 and the gripping means or assembly 74 further assures centering of the pocket 12 relative to axis 31, should the pocket be slightly misaligned or off-center relative to the central axis 31 of the article delivery station 26. In this regard, it was previously the practice to use a generally Y-shaped yoke device to engage the pin 50. However, it has been found that if the stabilizer pocket was slightly misaligned or off-center relative to central axis 26, that the yoke might either entirely miss or, in the alternative, engage the pin forcefully along a leading edge thereof, rather than in the yoke or recess portion thereof as intended. In either instance, this could result in misalignment of the carrier pocket 12, and also could possibly cause damage to the carrier pocket, perhaps even dislodging it from the track or chain 16. Such a sudden and forceful engagement with the pin 50 might also dislodge or cause misalignment of the stack of articles or cartons carried within the carrier pocket 12.

In the illustrated embodiment, the provision of the separate, spaced apart rocker members 70, 72 assures that the rocker members will approach the stabilizer pin 50 from either side, such that the stabilizer pin 50 will be gripped from the sides, and such that any slight misalignment will be overcome by the closing action of the rocker members 70 and 72.

In the illustrated embodiment, each of the rocker members 70 and 72 comprises a generally L-shaped member having a stabilizer pin-engaging surface 82, 84 thereof at a side which generally faces the stabilizer pin 50. The center or apex portions of the L-shaped rockers 70,72 are pivotally mounted in respect of pivot pins or shafts 78, 80. These pivot pins or shafts are generally parallel and spaced from the pin axis 51 and mount the rocker members for pivoting in an arc of motion to either side of stabilizer pin 50 about the axis 51. Preferably this arc of motion is somewhat in excess of 45° for each of the rocker members 70 and 72 such that an angle of somewhat greater than 90° is defined between the pin-engaging surfaces 82, 84 when the rocker members are in the first position, that is completely withdrawn from engagement with the stabilizer pin 50.

The drive means 76 and mounting means 74 are arranged for driving or rotating the rockers 70, 72 about their pivots 78, 80 so as to move the engaging surfaces 82 and 84 into a parallel position closely spaced to either side of and in engagement with the stabilizer pin 50, as illustrated in phantom line in FIG. 5. The first or rest position of the rocker arms 70 and 72 defined by the mounting means 74 and drive means 76 is further such that the pin-engaging surfaces 82, 84 and in particular extreme outer ends 82a, 84a thereof are held spaced apart from a line of motion 55 which is defined by the stabilizer pin as the carrier pocket 12 traverses the article delivery station 26. Preferably, the rocker arms 70 and 72 and related assembly are mounted behind a cover plate 85 which has an elongate and relatively narrow through aperture 86 therethrough sized to receive the pin-engaging surfaces and related portions of the rocker arms 70, 72 therethrough as illustrated in FIGS. 5 and 6.

In the illustrated embodiment, the mounting means 74 further include a pair of slidably mounted projecting pins or rod-like members 88, 90 which are mounted for slidable motion relative to elongate slots 92, 94 and which are engaged with ends of the L-shaped rocker members generally to the opposite side of the central pivot points from the locations of the pin-engaging surfaces 82, 84. The slots 92 and 94 are in turn formed in a carrier plate 96 which is bidirectionally reciprocated in a direction generally toward and away from the stabilizer pin 50 over a relatively short distance of travel, by the drive means 76. Preferably, the drive means 76 comprises a powered slide member with a relatively short stroke, the full forward position thereof with respect to the stabilizer pin 50 being shown in phantom line in FIG. 5.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An article delivery station alignment apparatus for use with a carousel-type rotary infeed device for articles arranged in stacks of a predetermined length, which infeed device comprises a plurality of carrier pockets each for receiving one of said stacks of articles and movable about a closed track relative to an article delivery station wherein articles are to be discharged from said carrier pockets, said article delivery station being located at one end of said track and defining a vertical axis, said carrier pockets and the stacks of articles therein being aligned with respective axes parallel to said vertical axis, and wherein said track comprises a closed chain member engaging said carrier pockets and engaged with a plurality of sprockets, said alignment apparatus comprising: a pair of sprockets located adjacent said article delivery station, one of said sprockets being spaced to either side of said vertical axis and engaging said chain member for defining a relatively short, straight segment of said chain member traversing said article delivery station; rigid chain guide means located between said sprockets for holding said chain member in a relatively straight and rigid condition as it traverses said article delivery station intermediate said pair of sprockets, said pair of sprockets and said chain guide means cooperating for aligning a carrier sprocket carried by said chain member and positioned between said pair of said sprockets with said vertical axis of said article delivery station and for discouraging pivotal, rocking motion of said carrier pocket relative to said vertical axis; and stabilizing means comprising a projecting stabilizer pin on each of said carrier pockets defining a pin axis and gripping means located at said article delivery station, said gripping means comprising a pair of complementary rocker members spaced to either side of said pin axis, mounting means for mounting said rocker members for pivotal motion toward and away from said pin axis and drive means for driving said rocker members between a first position spaced apart from and to either side of said stabilized pin of a carrier pocket located in said article delivery station and a second position grippingly engaging said stabilizer pin.

2. Apparatus according to claim 1 wherein each of said rocker members includes a stabilizer pin-engaging surface and wherein said mounting means includes a pair of pivot shafts parallel and spaced from said pin axis and respectively pivotally mounting said rocker members for pivoting said stabilizer pin-engaging surfaces in an arc of motion to either side of said stabilizer pin about said pivot axis.

3. Apparatus according to claim 2 wherein said pivot shafts are located for mounting said rocker members for pivotal movement in a generally mirror image sense for defining an angle of greater than 90° between said pin-engaging surfaces when said rocker members are in said first position and for moving said pin-engaging surfaces into a parallel position with each other and in close gripping engagement with said stabilizer pin when said rocker members are in said second position.

4. Apparatus according to claim 2 wherein said mounting means and said rocker members are configured for defining said arc of motion of each of said rocker members of greater than 45° and for holding outermost ends of said pin-engaging surfaces spaced apart from a line of motion defined by said stabilizer pin as said carrier pocket traverses said article delivery station when said rocker members are in said second position.

5. Apparatus according to claim 1 wherein said stabilizer pin defines an axis generally perpendicular to said vertical axis and further including bracket means for mounting said stabilizer pin generally beneath said carrier pocket.

6. Apparatus according to claim 1 wherein said chain guide means comprises a generally U-shaped channel member located between said pair of closely spaced sprockets and through which said chain runs, and a quantity of expanded foam material disposed in said channel for close engagement with said chain.

7. An article delivery station stabilizing apparatus for use with a carousel-type rotary infeed device for articles arranged in stacks of a predetermined length, which infeed device comprises a plurality of carrier pockets each for receiving one of said stacks of articles and movable about a closed track relative to an article delivery station wherein articles are to be discharged from said carrier pockets, said article delivery station being located at one end of said track and defining a vertical axis, said carrier pockets and the stacks of articles therein being aligned with respective axes parallel to said vertical axis, and wherein said track comprises a closed chain member engaging said carrier pockets and engaged with a plurality of sprockets, said stabilizing apparatus comprising: a projecting stabilizer pin on each of said carrier pockets defining a pin axis and gripping means located at said article delivery station, said gripping means comprising a pair of complementary rocker members spaced to either side of said pin axis, mounting means for mounting said rocker members for pivotal motion toward and away from said pin axis and drive means for driving said rocker members between a first position spaced apart from and to either side of said stabilizer pin of a carrier pocket located in said article delivery station and a second position grippingly engaging said stabilizer pin.

8. Apparatus according to claim 7 wherein each of said rocker members includes a stabilizer pin-engaging surface and wherein said mounting means includes a pair of pivot shafts parallel and spaced from said pin axis and respectively pivotally mounting said rocker members for pivoting said stabilizer pin-engaging surfaces in an arc of motion to either side of said stabilizer pin about said pivot axis.

9. Apparatus according to claim 8 wherein said pivot shafts are located for mounting said rocker members for pivotal movement in a generally mirror image sense for defining an angle of greater than 90° between said pin-engaging surfaces when said rocker members are in said first position and for moving said pin-engaging surfaces into a parallel position with each other and in close gripping engagement with said stabilizer pin when said rocker members are in said second position.

10. Apparatus according to claim 8 wherein said mounting means and said rocker members are configured for defining said arc of motion of each of said rocker members of greater than 45° and for holding outermost ends of said pin-engaging surfaces spaced apart from a line of motion defined by said stabilizer pin as said carrier pocket traverses said article delivery station when said rocker members are in said second position.

11. Apparatus according to claim 7 wherein said stabilizer pin defines an axis generally perpendicular to said vertical axis and further including bracket means for mounting said stabilizer pin generally beneath said carrier pocket.

12. An article delivery station alignment apparatus for use with a carousel-type rotary infeed device for articles arranged in stacks of a predetermined length, which infeed device comprises a plurality of carrier pockets each for receiving one of said stacks of articles and movable about a closed track relative to an article delivery station wherein articles are to be discharged from said carrier pockets, said article delivery station being located at one end of said track and defining a vertical axis, said carrier pockets and the stacks of articles therein being aligned wit respective axes parallel to said vertical axis, and wherein said track comprises a closed chain member engaging said carrier pockets and engaged with a plurality of sprockets, said alignment apparatus comprising: a pair of sprockets located adjacent said article delivery station, one of said sprockets being spaced to either side of said vertical axis and engaging said chain member for defining a relatively short, straight segment of said chain member traversing said article delivery station, and rigid chain guide means located between said sprockets for holding said chain member in a relatively straight and rigid condition as it traverses said article delivery station intermediate said pair of sprockets, said pair of sprockets and said chain guide means cooperating for aligning a carrier pocket carried by said chain member and positioned between said pair of said sprockets with said vertical axis of said article delivery station and for discouraging pivotal, rocking motion of said carrier pocket relative to said vertical axis; wherein said chain guide means comprises a generally U-shaped channel member located between said pair of sprockets and through which said chain runs, and a quantity of expanded foam material disposed in said channel for close engagement with said chain.

* * * * *

UNITED STATES PATENT AND TRADEMARK OFFICE
CERTIFICATE OF CORRECTION

PATENT NO. : 5,346,050
DATED : September 13, 1994
INVENTOR(S) : Daniel R. Mojden and Thomas E. Close, Jr.

It is certified that error appears in the above-indentified patent and that said Letters Patent is hereby corrected as shown below:

Column 8, Line 58 "wit" should be —with—

Signed and Sealed this

Thirty-first Day of January, 1995

Attest:

BRUCE LEHMAN

*Attesting Officer*   *Commissioner of Patents and Trademarks*